(12) United States Patent
Patel et al.

(10) Patent No.: US 6,939,927 B1
(45) Date of Patent: Sep. 6, 2005

(54) PROCESS FOR MAKING VINYL PYRROLIDONE/VINYL ACETATE COPOLYMERS HAVING A VERY LOW RESIDUAL VINYL PYRROLIDONE MONOMER LEVEL WITHIN A SHORT PRODUCTION CYCLE

(75) Inventors: Drupesh Patel, Lake Hiawatha, NJ (US); Paul Taylor, Parsippany, NJ (US); John Mc Kittrick, Jersey City, NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 10/946,500

(22) Filed: Sep. 21, 2004

(51) Int. Cl.$^7$ ................................. C08F 2/00
(52) U.S. Cl. ..................... 526/81; 526/71; 526/212; 526/264; 526/330
(58) Field of Search ................... 526/71, 81, 212, 526/264, 330

(56) References Cited

U.S. PATENT DOCUMENTS

| | | | | |
|---|---|---|---|---|
| 5,239,053 A | * | 8/1993 | Tseng et al. | 528/483 |
| 5,319,041 A | * | 6/1994 | Zhong et al. | 526/73 |
| 5,387,641 A | * | 2/1995 | Yeung et al. | 524/557 |
| 5,395,904 A | * | 3/1995 | Zhong et al. | 526/264 |
| 5,502,136 A | * | 3/1996 | Zhong et al. | 526/264 |
| 5,534,564 A | * | 7/1996 | Zhong et al. | 523/340 |

* cited by examiner

*Primary Examiner*—Helen L. Pezzuto
(74) *Attorney, Agent, or Firm*—Walter Katz; William J. Davis

(57) ABSTRACT

Vinyl pyrrolidone/vinyl acetate copolymers having a very low residual vinyl pyrrolidone monomer level, i.e. <100 ppm, preferably only 50 ppm, are made within an advantageously short production cycle, by post-treating an aqueous solution of the copolymer at an elevated temperature of about 120–150° C., preferably about 130° C., under pressure, in the presence of a high temperature initiator, for a period of about 1–4 hours, preferably 2 hours.

5 Claims, No Drawings

PROCESS FOR MAKING VINYL PYRROLIDONE/VINYL ACETATE COPOLYMERS HAVING A VERY LOW RESIDUAL VINYL PYRROLIDONE MONOMER LEVEL WITHIN A SHORT PRODUCTION CYCLE

BACKGROUND OF THE INVENTION

1. Field of the Invention

This invention relates to a process for making vinyl pyrrolidone (VP)/vinyl acetate (VA) copolymers, and, more particularly, to improved manufacture of such copolymers having a very low residual VP level, within an advantageously short production cycle.

2. Description of the Prior Art

Potthoff-Karl, in U.S. Pat. No. 5,122,582, described a process for making VP/NA copolymers by copolymerization of the monomers in isopropanol (IPA) solvent in the presence of a radical initiator, steam distilling off the IPA, replacing it with water, (although none of the examples therein include this step) adding more initiator in IPA, post-heating the mixture at about 80° C. for a period of 4½ hours, and again, removing IPA by steam distillation. However, the residual VP content of the copolymer solution obtained was high, e.g. 500 ppm (Ex. 1); 900 ppm (Ex. 2) and 1000 ppm (Ex. 3), based upon the amount of VP employed. Moreover, the duration of the post-treatment step also was excessively long.

Accordingly, it is the object of this invention to provide a new and improved process for making VP/NA copolymers having a very low residual VP level, i.e. <100 ppm, preferably only 50 ppm, in which the post-treatment step is carried out in water only and requires a heating period of only 1–4 hours, preferably only about 2 hours.

DESCRIPTION OF THE INVENTION

What is described herein is a process of making vinyl pyrrolidone (VP)/vinyl acetate (VA) copolymers having a very low residual VP level of <100 ppm, preferably only 50 ppm, based upon the VP monomer used, which comprises copolymerizing VP and VA in isopropanol (IPA) solvent in the presence of a radical initiator, preferably including a high temperature initiator, at about 65–90° C., stripping the IPA while simultaneously adding water, to form an aqueous solution of the copolymer, and then post-heating said aqueous solution at about 120–150° C., preferably about 130° C., under pressure, for a period of about 1–4 hours, preferably about 2 hours.

Suitably, the VP/NA copolymer includes, by wt., about 50–70% VP and about 30–50% VA.

Examples of suitable radical initiators for use herein are dimethyl 2,2'-azobisisobutyrate, dilauroyl peroxide, dibenzoyl peroxide, dicumyl peroxide, di-tert-butyl peroxide, hydrogen peroxide and, percarboxylic esters such as tert-butyl perneodecanoate, tert-amyl perpivalate, tert-butyl perpivalate, tert-butyl peroxy-2-ethylhexanoate and tert-butyl perbenzoate. Preferred initiators for use during the polymerization step are t-butyl-peroxypivalate (Lupersol® 11), and 2,2'-azodi(2-methylbutyronitrile) (Vazo® 67); while preferred high temperature initiators for use during the post-treatment step include 2,5-dimethyl-2,5-di(t-butylperoxy) hexane (Lupersol® 101): and di-t-butyl peroxide.

The invention will now be described in more detail by way of the following examples, in which:

INVENTION EXAMPLE 1

Preparation of Copolymer of VP/NA (70:30 wt. %)

1. Set up a 1-liter pressured reactor and charged
   41.21 g of VP
   22.01 g of vinyl acetate and
   32.61 g of isopropanol.

2. Purged the reaction system 2–3 times with nitrogen to 50 psig and releasing it.

3. Heated the reactor to 80° C.

4. At 75° C., time=0 min, started feeding a mixture of 0.95 g Vazo® 67, 0.93 g of Lupersol® 101 and 19.30 g of isopropanol. Completed the initiator feed within 340 minutes.

Also, at time=0 min, added a mixture of 140.29 g of VP, 74.29 g of vinyl acetate and 99.94 g of isopropanol continuously during a period of 240 minutes.

5. At 255 minutes, fed 43.83 g of VP in 19.80 g of isopropanol continuously in 60 minutes.

6. After completion of initiator feeding in 340 minutes, held the reaction mixture at 80° C. for 2 hours.

7. Then stripped the IPA solvent by steam distillation, while simultaneously adding water in an amount of 567 g.

8. After the solvent exchange step the solids level was about 50–60%.

9. Heated the aqueous copolymer solution under pressure to 130° C.

10. Held the reaction mixture at 130° C. for about 2 hours. The residual VP level in the mixture was 50 ppm.

EXAMPLE 2

The procedure of Example 1 was followed to produce a copolymer of VP/NA having a wt. ratio of 60:40 with a similarly low VP level.

EXAMPLE 3

The procedure of Example 1 was followed to produce a VP/NA copolymer having a wt. ratio of 50:50 with a similarly low VP level.

COMPARATIVE EXAMPLE

Preparation of Copolymer of VP/NA (70:30 wt. %)

The procedure of Example 1 was followed up to step 6.

7. Heated the reaction mixture in IPA to 130° C. for post-treatment.

8. Held the reaction mixture for 2 hours. The residual VP level was 1007 ppm.

What is claimed is:

1. A process of making vinyl pyrrolidone (VP)/vinyl acetate (VA) copolymers having a very low residual VP level of <100 ppm based upon the amount of VP used which comprises copolymerizing VP and VA in isopropanol (IPA) solvent in the presence of a low temperature radical initiator, continuously stripping the IPA while simultaneously adding water to form an aqueous solution of the copolymer, and post-heating said aqueous solution at about 120–150° C. in the presence of a high temperature initiator, for a period of 1–4 hours.

2. A process according to claim 1 wherein said post-heating step is carried out at about 130° C. for a period of about 2 hours.

3. A process according to claim 1 wherein both said low and high temperature radical initiators are added during the polymerization step.

4. A process according to claim 1 wherein said VP/NA copolymer comprises, by wt., about 50–70% VP and about 30–50% VA.

5. A process according to claim 1 wherein said high temperature radical initiator is 2,5-dimethyl-2,5-di(t-butylperoxy) hexane.

* * * * *